United States Patent
Lin et al.

(10) Patent No.: US 7,606,947 B2
(45) Date of Patent: Oct. 20, 2009

(54) REMOVABLE ELECTRONIC DEVICE AND METHOD THEREOF

(75) Inventors: Chanson Lin, Hsinchu County (TW); Chih-Yuan Liu, Hsinchu County (TW); Chung Liang Lee, Taipei (TW); Gordon Yu, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 179 days.

(21) Appl. No.: 11/190,233

(22) Filed: Jul. 27, 2005

(65) Prior Publication Data

US 2006/0053241 A1    Mar. 9, 2006

Related U.S. Application Data

(60) Provisional application No. 60/607,344, filed on Sep. 7, 2004.

(51) Int. Cl.
    *G06F 3/00* (2006.01)
(52) U.S. Cl. .................. 710/14; 710/8; 710/11; 710/62; 713/400
(58) Field of Classification Search .................. None
    See application file for complete search history.

(56) References Cited

U.S. PATENT DOCUMENTS

| 5,061,190 A | 10/1991 | Medeiors et al. |
| 6,524,137 B1 * | 2/2003 | Liu et al. ..................... 439/638 |
| 7,106,337 B2 * | 9/2006 | Lu ............................ 345/536 |
| 2003/0018925 A1 * | 1/2003 | Mohammad ................ 713/600 |
| 2003/0233501 A1 * | 12/2003 | Ma et al. ...................... 710/62 |
| 2004/0027879 A1 * | 2/2004 | Chang ........................ 365/200 |
| 2004/0070952 A1 * | 4/2004 | Higuchi et al. ............. 361/737 |
| 2004/0076048 A1 * | 4/2004 | Kabenjian et al. .......... 365/200 |

OTHER PUBLICATIONS

MMCA Technical Committee, "The MultiMediaCard System Summary Based on System Specification Version 3.31" MulliMediaCard Assocation, Mar. 2003, http://www.mmca.org/compliance/buy_spec/MMC-System-Summary-v3.31.pdf.*

* cited by examiner

*Primary Examiner*—Eron J Sorrell
(74) *Attorney, Agent, or Firm*—Alston & Bird LLP (57) ABSTRACT

A removable electronic device includes a detector for detecting a mode of operation to distinguish among a multimedia card (MMC) compatible mode, a universal serial bus (USB) compatible mode, and a Mu mode, a wrapper for converting data for transfer between the USB compatible mode and the Mu mode, a USB physical layer circuit for transferring data compatible with the USB compatible mode, a USB compatible device controller for controlling data transfer in the USB compatible mode, and an MMC compatible device controller for controlling data transfer in the MMC compatible mode.

22 Claims, 10 Drawing Sheets

| Pin List | MMC 4.0 | MMC SPI | USB 2.0 | Mu-interface |
|---|---|---|---|---|
| 1 | DAT3 | CS# | | DAT3 |
| 2 | CMD | D_In | | DAT8 |
| 3 | VSS1 | VSS1 | VSS1 | VSS1 |
| 4 | VDD | VDD | VDD | VDD |
| 5 | CLK | SCLK | | CLK |
| 6 | VSS2 | VSS2 | VSS2 | VSS2 |
| 7 | DAT0 | D_Out | | DAT0 |
| 8 | DAT1 | | | DAT1 |
| 9 | DAT2 | | | DAT2 |
| 10 | DAT4 | | | DAT4 |
| 11 | DAT5 | | | DAT5 |
| 12 | DAT6 | | | DAT6 |
| 13 | DAT7 | | | DAT7 |
| 14 | | | D+ | DAT9 |
| 15 | | | D- | DAT10 |
| 16 | | | | DAT11 |
| 17 | | | | DAT12 |
| 18 | MRST# | MRST# | MRST# | DAT13 (MRST#) |
| 19 | MDAT | MDAT | MDAT | DAT14 (MDAT) |
| 20 | MCLK | MCLK | MCLK | DAT15 (MCLK) |

FIG. 4A

| Pin List | MMC 4.0 | MMC SPI | USB 2.0 | Mu-interface | SIM |
|---|---|---|---|---|---|
| 1 | DAT3 | CS# | | DAT3 | |
| 2 | CMD | D_In | | EOP | |
| 3 | VSS1 | VSS1 | VSS1 | VSS1 | VSS1 |
| 4 | VDD | VDD | VDD | VDD | VDD |
| 5 | CLK | SCLK | | CLK | |
| 6 | VSS2 | VSS2 | VSS2 | VSS2 | VSS2 |
| 7 | DAT0 | D_Out | | DAT0 | |
| 8 | DAT1 | | | DAT1 | |
| 9 | DAT2 | | | DAT2 | |
| 10 | DAT4 | | | DAT4 | |
| 11 | DAT5 | | D- | DAT5 | MCLK |
| 12 | DAT6 | | D+ | DAT6 | MRST# |
| 13 | DAT7 | | | DAT7 | MDAT |

REMOVABLE ELECTRONIC DEVICE AND METHOD THEREOF

CROSS-REFERENCE TO RELATED APPLICATIONS

This application claims the benefit of U.S. Provisional Application No. 60/607,344, filed Sep. 7, 2004, which is herein incorporated by reference in its entirety.

BACKGROUND OF THE INVENTION

The present invention relates generally to a removable electronic device and, more particularly, to a removable memory card standard and method thereof.

A memory card is commonly known as a small portable package containing digital memory, such as an array of non-volatile memories, such as flash memories, EPROMs, or EEPROMs (electrically erasable and programmable read only memory). Memory cards have gain popularity as a device for storing a substantial amount of bytes of data from personal computers, notebook computers, personal electronic assistants, cellular telephones, cameras and other electronic devices that support removable data storage.

In general, a memory card includes exposed electrical contacts on its surface to allow easy connection to and removal from a receptacle of a host electronic system or device, particularly portable devices. A number of standards for a memory card have been implemented, including the Multi-Media Card ("MMC") by the MultiMedia Card Association ("MMCA") of Cupertino, Calif. An MMC is a compact, removable memory card for storing and retrieving digital information in small, low power devices. MMC has been used in many mobile electronic applications, such as music players, mobile phones, personal digital assistants (PDAs), digital cameras, voice recorders, and GPS navigation devices. The MMCA developed and regulated its open industry standards, and also defined all types of MMCs as an industry standard across multiple host platforms and markets. The physical and electrical specifications for the MMC are given in "The MultiMediaCard System Specification" that is updated and published from time-to-time by the MMCA.

Another known standard for a removable memory card, although not limited to memory storage, is the Universal Serial Bus ("USB"). USB is a high-speed serial bus that supports devices such as printers, keyboards, scanners, pointing devices, and PDAs. USB has become a standard within the computer industry as this protocol affords networking of multiple devices with minimal connections and increased user friendliness. USB is currently defined by the Universal Serial Bus Specification, written and controlled by USB Implementers Forum, Inc., a non-profit corporation founded by a group of companies that developed the USB specification. The specification covers all aspects of USB operations, including electrical, mechanical, and communications characteristics and specifications. One significant feature of the USB is that it allows a peripheral device to store information about itself, and to provide such information upon request by the host. This obviates the need for the host, be it a computer, operating system, or application program, to maintain this information for many different devices. Instead, the device itself stores and provides the information.

In the evolution of memory cards, it is desirable to have memory cards that consumes low power and provides higher speed for accessing, while still retaining backward compatibility with existing protocols such as the MMC and USB specifications.

BRIEF SUMMARY OF THE INVENTION

A novel removable memory card standard is disclosed. The standard of the present invention includes both detection schemes and hardware interface compatibility requirements. Furthermore, the novel standard is backward compatible with the MMC and USB applications.

In accordance with an embodiment of the present invention, there is provided a removable electronic device that comprises a detector for detecting a mode of operation to distinguish among a multimedia card (MMC) compatible mode, a universal serial bus (USB) compatible mode, and a Mu mode, a wrapper for converting data for transfer between the USB compatible mode and the Mu mode, a USB physical layer circuit for transferring data compatible with the USB compatible mode, a USB compatible device controller for controlling data transfer in the USB compatible mode, and an MMC compatible device controller for controlling data transfer in the MMC compatible mode.

Further in accordance with the present invention, there is provided a removable electronic device having an application module for transferring data to or from a host, the device comprising a detector for detecting a mode of operation among a plurality of modes of operations, including at least a Mu mode and a first mode of operations, a wrapper for converting the data to transfer between the first mode and the Mu mode, a circuit to transfer the data compatible with the first mode of operation, and a compatible device controller to control data transfer in the first mode.

Also in accordance with the present invention, there is provided a method for a removable electronic device to detect a mode of operation to distinguish among a multimedia card (MMC) compatible mode, a universal serial bus (USB) compatible mode and a Mu mode, the method comprising determining whether a power source voltage is greater than a predetermined voltage level, assessing the USB compatible mode when the power source voltage is greater than the predetermined voltage level, receiving a command signal sent from a host, determining whether the command signal corresponds to a Mu format, and assessing the Mu mode operation when the command signal corresponds to the Mu format or otherwise assessing the MMC compatible mode.

Still in accordance with the present invention, there is provided a method for a removable electronic device to detect a mode of operation to distinguish between a multimedia card (MMC) compatible mode and a Mu mode, the method comprising receiving a command signal sent from a host, determining whether the command signal corresponds to a Mu format, and assessing the Mu mode operation when the command signal corresponds to the Mu format or otherwise assessing the MMC compatible mode.

Yet still in accordance with the present invention, there is provided a method for a device that receives a removable electronic device to detect a mode of operation between at least a multimedia card (MMC) compatible mode and a Mu mode, the method comprising sending a command signal corresponding to a Mu format after receiving the removable electronic device, detecting whether the removable electronic device responds to the command signal, assessing that the mode of operation is the MMC compatible mode if the removable electronic device does not respond to the command signal, and providing a Mu interface if the removable electronic device responds to the command signal.

Further in accordance with the present invention, there is provided a method for a device that receives a removable electronic device to detect a Mu mode of operation, the method comprising receiving a removable electronic device, sending a command signal to corresponding to a Mu format to the removable electronic device, detecting whether the removable electronic device responds to the command signal, and providing a Mu interface after the removable electronic device responds to the command signal.

Still in accordance with the present invention, there is provided a method for a removable electronic device to detect a mode of operation to distinguish between a first mode of operation and a Mu mode of operation, the method comprising receiving a command signal sent from a host, determining whether the command signal corresponds to a Mu format, and assessing the Mu mode of operation when the command signal corresponds to the Mu format or otherwise assessing the first mode of operation.

Yet still in accordance with the present invention, there is provided a method for a device that receives a removable electronic device to detect a mode of operation between a first mode of operation and a Mu mode of operation, the method comprising sending a command signal corresponding to a Mu format after receiving the removable electronic device, detecting whether the removable electronic device responds to the command signal, assessing that the mode of operation is the first mode of operation if the removable electronic device does not respond to the command signal, and providing a Mu interface if the removable electronic device responds to the command signal.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one embodiment of the present invention and together with the description, serves to explain the principles of the invention.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

Figure 1A:
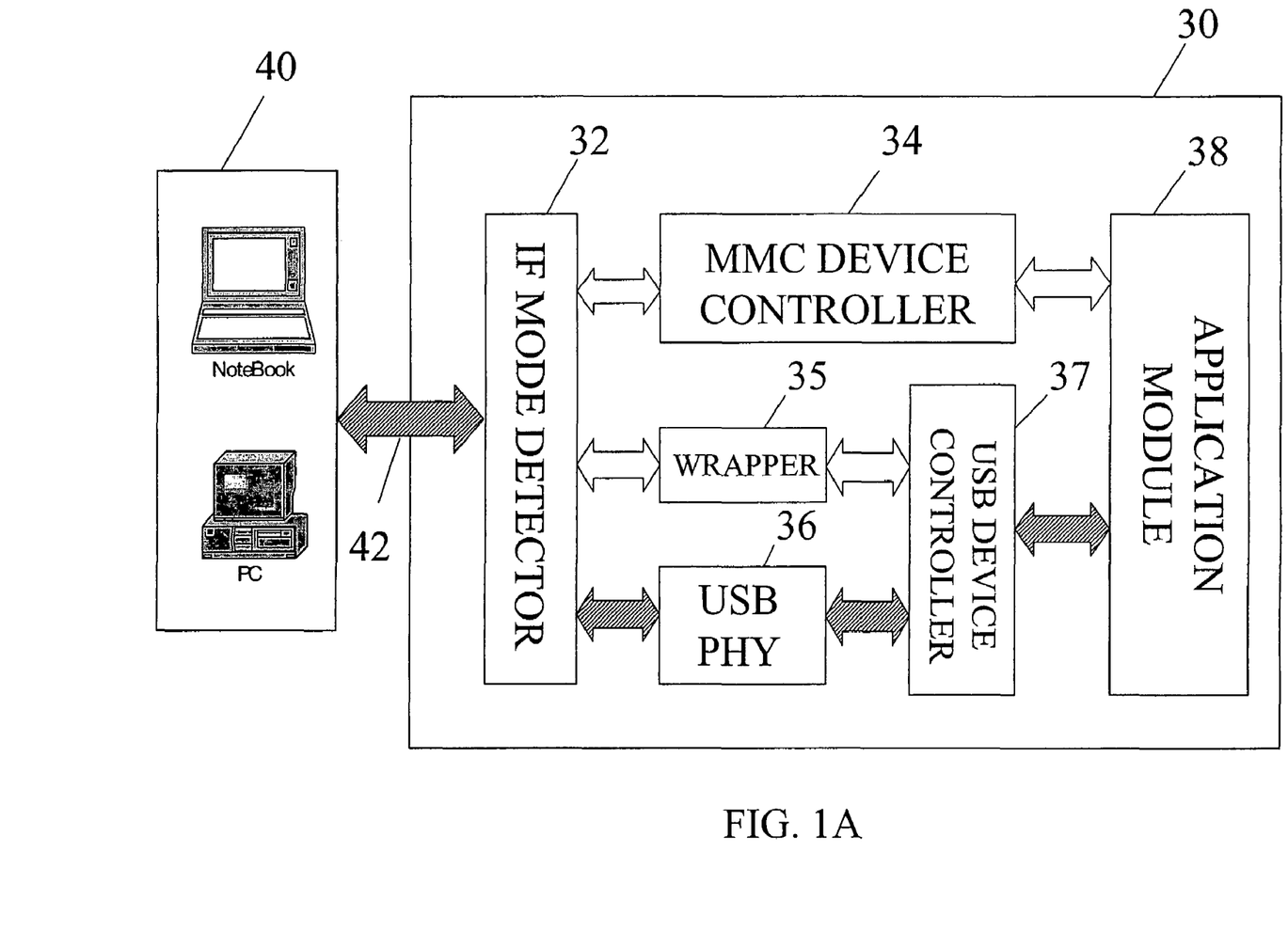
FIGS. 1A, 1B and 1C are functional block diagrams of the general applications of a memory card in accordance with one embodiment of the present invention.
Figure 1B:
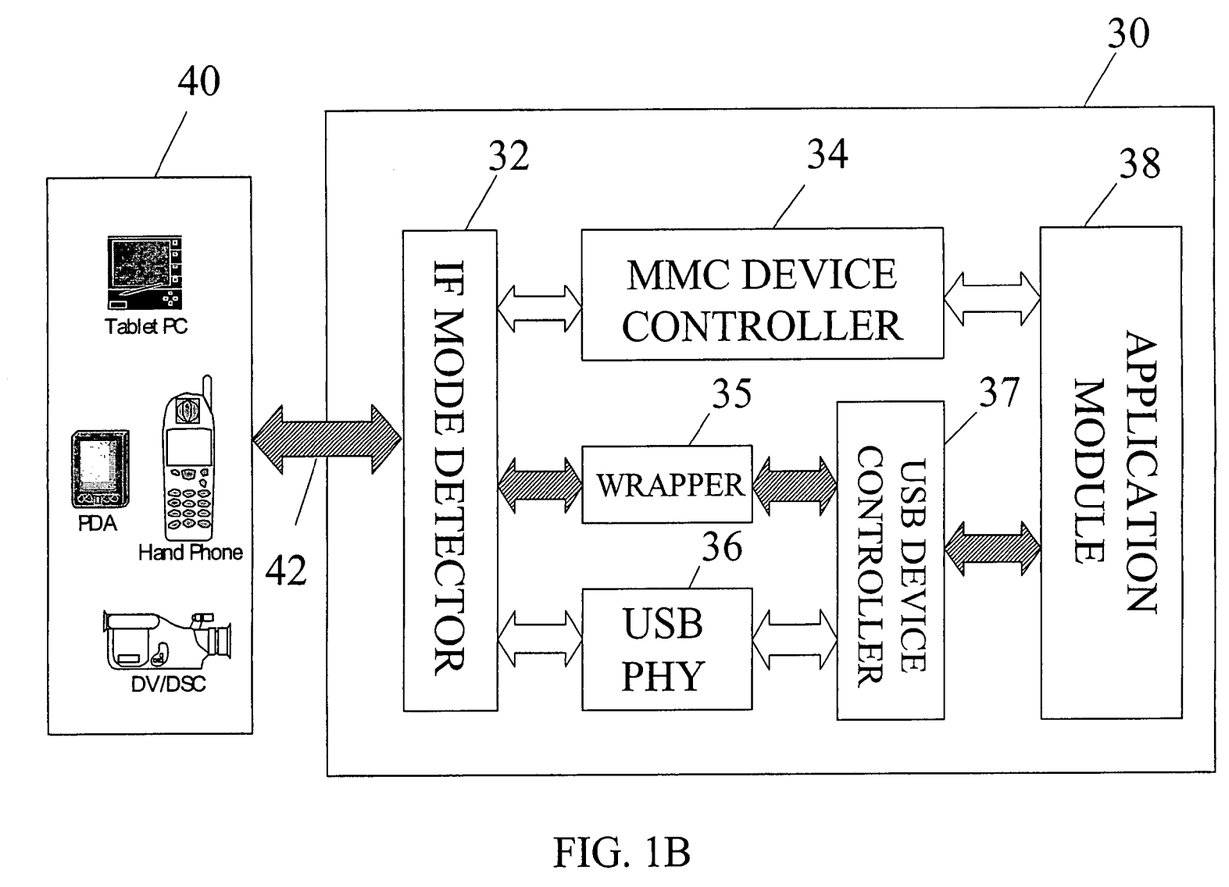
Figure 1C:
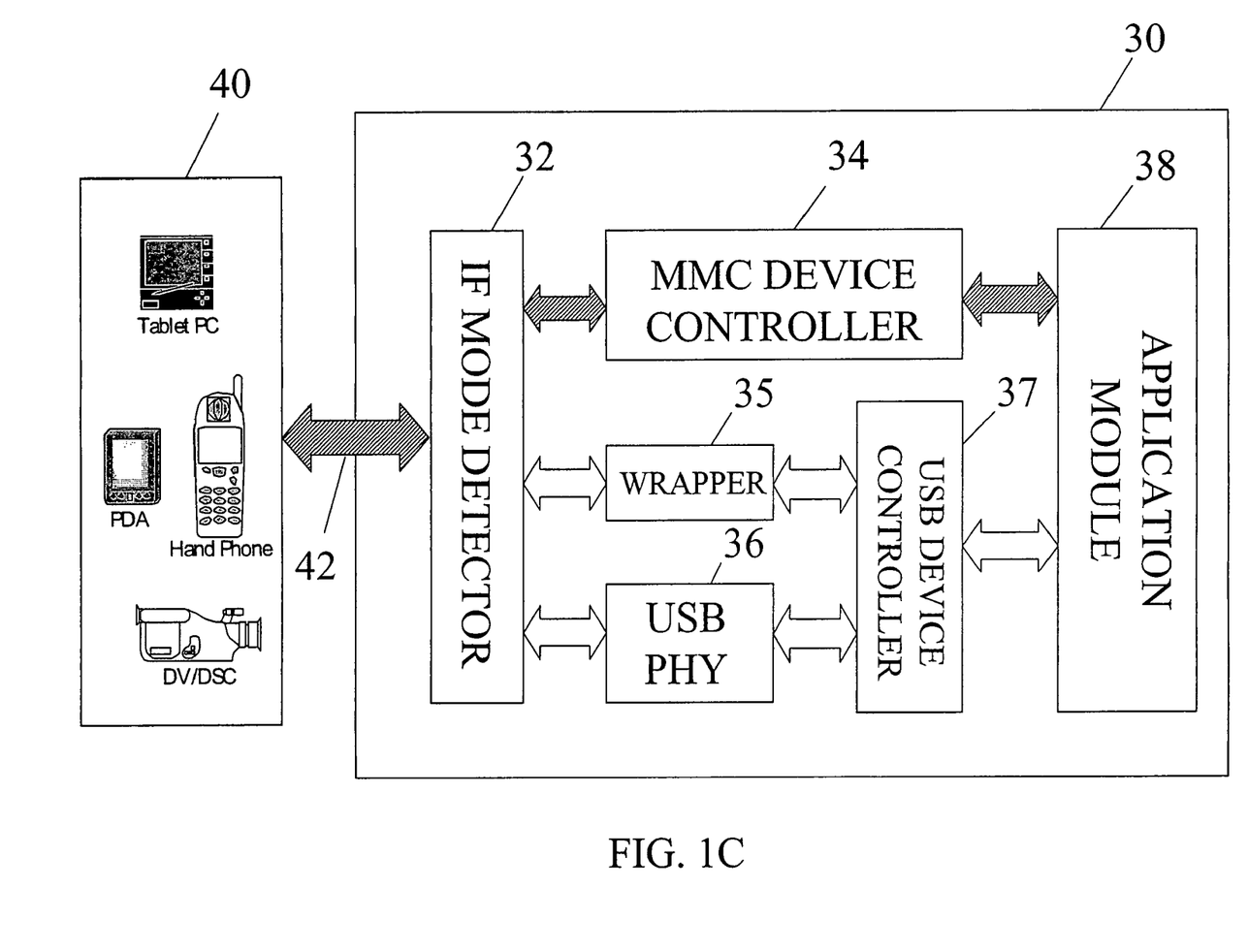

FIGS. 1A, 1B and 1C are functional block diagrams of general applications of a removable electronic device 30 in accordance with one embodiment of the present invention. Electronic device 30, tentatively named the "Mu Card," which is able to support modes of operations compatible with USB and at least one of MMC, CF (compact flash), SM (smart media) and SD (security digital) applications. For example, the USB compatible mode includes USB 2.0 application, and the MMC compatible mode includes one of MMC 4.0 or MMC SPI (serial-peripheral interface) applications. For the purpose of simplicity, only the MMC compatible mode is illustrated in the following embodiments. Skilled persons in the art will understand that the present invention is equally applicable to the CF, SM and SD modes.

Electronic device 30 includes a 1-, 4-, 8- or 16-bit interface, and provides low voltage support of 5V/3.3V/1.8V, with zero power consumption during standby. In addition, electronic device 30 is able to support a wide bandwidth from approximately 50 KB/s to 120 MB/s. In contrast, MMC 4.0 supports 1-, 4- or 8-bit data transfer at a maximum speed of 52 MB/sec, and USB 2.0 supports data transfer at a maximum speed of 60 MB/sec. Consequently, electronic device 30 provides high-speed applications while retaining backward compatibility at least with regard to USB, MMC and MMC SPI applications.

FIG. 1A is a functional block diagram of electronic device 30 operating in a USB mode. Referring to FIG. 1A, electronic device 30 includes an interface (IF) mode detector 32, a multi-media card (MMC) device controller 34, a wrapper 35, a universal serial bus (USB) physical layer (PHY) circuit 36, a USB device controller 37, and an application module 38. IF mode detector 32 detects a mode of operation to distinguish among an MMC mode, a USB mode or a Mu mode when electronic device 30 is inserted into a host 40. Host 40, for example, a notebook, a personal computer (PC), a cell phone, a tablet PC, a PDA or a DV/DSC, may include a card reader (not shown) for receiving electronic device 30. In the present embodiment, IF mode detector 32 detects whether a host 40, to which electronic device 30 is connected, is in compliance with the USB specifications. USB device controller 37 controls data transfer over a common bus 42 between host 40 and application module 38 via USB PHY circuit 36. Application module 38 functions to serve as a memory storage or an input/output (I/O) interface, depending on the operation mode detected.

FIG. 1B is a functional block diagram of electronic device 30 operating in a Mu mode. Referring to FIG. 1B, 1F mode detector 32 detects that a host 40, to which electronic device 30 is connected, is in compliance with the Mu specifications. USB device controller 37 controls data transfer between host 40 and application module 38 via wrapper 35. Wrapper 35, which wraps a call to a function or program inside another function or program, functions to convert 16-bit data into serial data recognizable by USB device controller 37, or vice versa. As such, wrapper 35 functions to bridge between a Mu bus and a UTMI (USB 2.0 Transceiver Macrocell Interface) bus. UTMI, which has been developed to define the interface specifications of the physical layer circuits and part of the logical layer circuits of the USB 2.0, enables a data transfer rate of 480 Mbps in high speed (HS) mode, which is significantly higher than that of the USB 1.1, while maintaining backward compatibility with the USB 1.1 standard.

FIG. 1C is a functional block diagram of electronic device 30 operating in an MMC mode. Referring to FIG. 1C, 1F mode detector 32 detects that a host 40, to which electronic device 30 is connected, is in compliance with the MMC specifications. MMC device controller 34 controls data transfer between host 40 and application module 38. The MMC application includes one of MMC 4.0, a 1-, 4- or 8-bit interface, or MMC SPI, a 1-bit interface.

Figure 2:
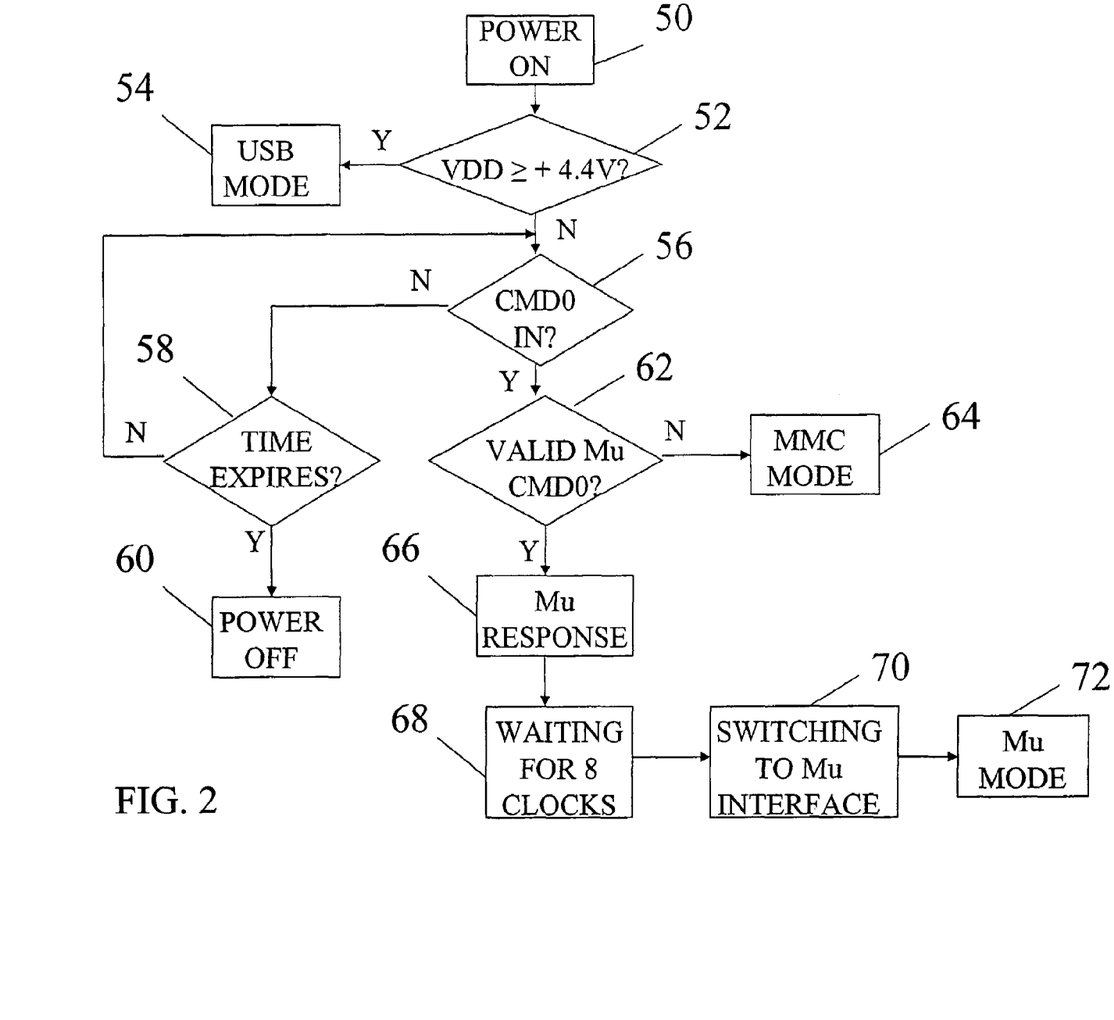
FIG. 2 is a flow diagram of a method for detecting a mode of operation in accordance with one embodiment of the present invention.

FIG. 2 is a flow diagram of a method for detecting a mode of operation in accordance with one embodiment of the present invention. Referring to FIG. 2, on the device side, host 40 to which electronic device 30 is connected is turned on at step 50. The power source voltage, VDD, for host 40 is detected at step 52 to determine whether the VDD is equal to or greater than a voltage level a USB application requires. Normally, a USB application is operated at a voltage level ranging from approximately 4.5V (volts) to 5.5V, while an MMC or an Mu application is operated at a voltage level of approximately 1.8V or 3.3V. In one embodiment, if the VDD level for host 40 is equal to or greater than 4.4V, a determination is made at step 54 that the mode of operation is USB 2.0. If the VDD level for host 40 is smaller than 4.4V, a determination is made that the mode of operation is either a Mu application or an MMC application.

Next, a determination is made at step 56 whether a command signal CMD0 sent from host 40 is received by electronic device 30. Detection of the command signal CMD0 is performed within a predetermined time period at step 58. If the predetermined time expires, host 40 is turned off, or "timed out" to save power at step 60. If the predetermined time does not expire, the detection of the command signal continues. When a command signal is received, a determination is made at step 62 whether the command signal indicates a Mu application. If the command signal is not a Mu command signal, a determination is made at step 64 that the mode of operation is an MMC application. If the command signal is determined to be a Mu command signal, electronic device 30 responds to host 40 that the mode of operation is a Mu application at step 66. Electronic device 30 then waits for a predetermined time, for example, 8 clocks, at step 68 for synchronization. Generally, the clock rate depends on the speed of host and system clocks. Electronic device 30 then switches at step 70 to a Mu interface for a Mu application at step 72.

Figure 3:
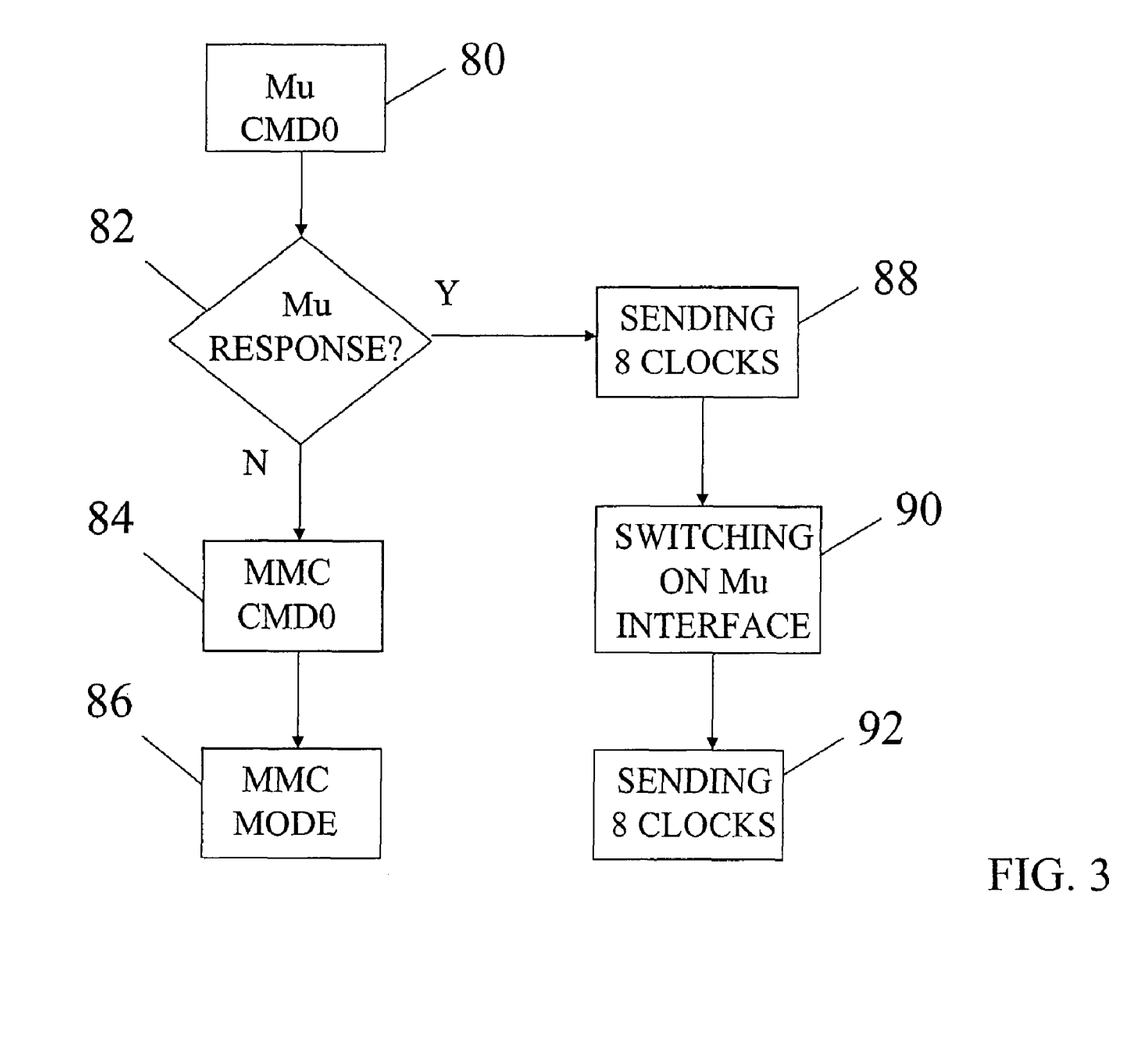
FIG. 3 is another flow diagram of a method for detecting a mode of operation in accordance with one embodiment of the present invention.

FIG. 3 is another flow diagram of a method for detecting a mode of operation in accordance with one embodiment of the present invention. Referring to FIG. 3, at the host side, host 40 sends a Mu command signal Mu CMD0 to electronic device 30 at step 80. If electronic device 30 at step 82 does not send a response signal, host 40 sends an MMC command signal MMC CMD0 at step 84, indicating that the mode of operation is the MMC application at step 86. If electronic device 30 at step 82 replies with a Mu response signal, host 40 sends a predetermined number of clocks, for example, 8 clocks, for synchronization at step 88. Electronic device 30 switches at step 90 to the Mu mode. At step 92, electronic device 30 may optionally send a signal to host 40, indicating that a Mu interface is ready.

By way of example, the command signals MMC CMD0 and Mu CMD0 are defined in a 6-byte format as "40h, 00h, 00h, 00h, 00h, 95h" and "40h, 4Dh, 55h, BFh, B2h, AAh," respectively. Furthermore, the Mu response signal is defined in a 6-byte format as "19h [4-byte operating parameters] FFh."

Figure 4A:
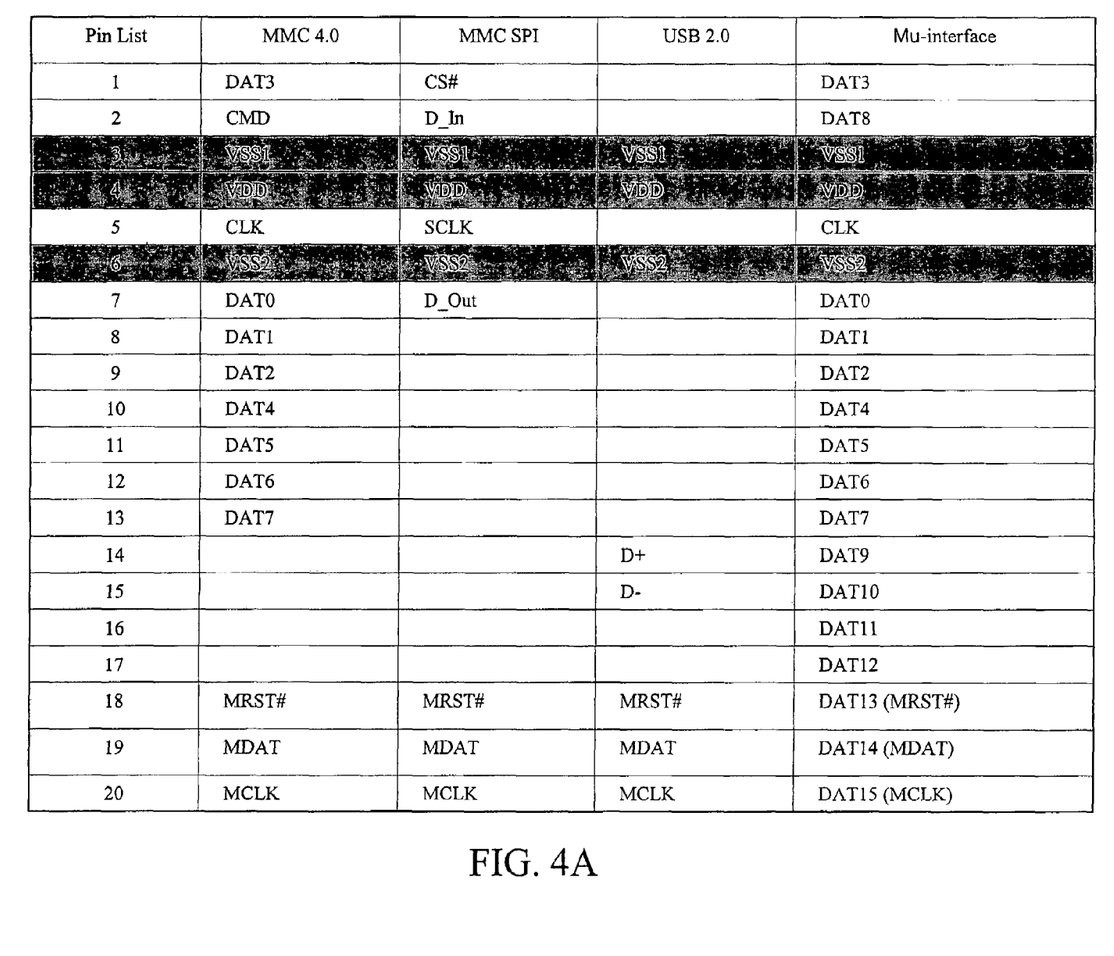
FIG. 4A is a proposed pin assignment chart of a removable electronic device in accordance with one embodiment of the present invention.

FIG. 4A is a proposed pin assignment chart of a removable electronic device in accordance with one embodiment of the present invention. Referring to FIG. 4A, all of the pins at the device side are kept as HiZ (high impedance) state until a mode of operation between a host and the removable electronic device is determined. The first pin of the removable electronic device for the MMC 4.0 mode, i.e., DAT 3, is defined to switch the MMC 4.0 mode to the MMC SPI mode, which has been defined in the MMC Specification. The second pin for the Mu interface mode, i.e., DAT 8, is used to identify that the MMC mode or Mu interface mode is selected. The fourteenth and fifteenth pins for the USB mode, i.e., D+ and D−, are a pair of data signals, which may be used to determine whether the USB mode is selected. The pair of data signals (D+, D−) is a complementary pair in which one is at a high level when the other is at a low level. Pins 18, 19 and 20 are reserved for SIMM (single in-line memory module) card applications. Thus, the removable electronic device of the present invention is able to support MMC compatible, USB compatible and Mu-interface applications, and simultaneously retains the flexibility of working for the SIMM applications.

An exemplary interface protocol of the present invention is described as follows:

1. Sync Field
(1) 1-bit: DAT=0b
   (2) 4-bit: DAT[3:0]=xxx0b
   (3) 8-bit: DAT[7:0]=xxxxxxx0b
   (4) 16-bit: DAT[15:0]=xxxxxxxxxxxxxxx0b Where "x" refers to a condition that is not relevant for the protocol.

2. PID Field
(1) 1-bit: LSB first
   DAT=PID[0] PID[1] PID[2] PID[3] nPID[0] nPID[1] nPID[2] nPID[3]
   (2) 4-bit:
      DAT[3:0]=PID[3:0] nPID[3:0]
   (3) 8-bit:
      DAT[7:4]=inverted of PID[3:0]
      DAT[3:0]=PID[3:0]

Where "nPID" refers to an inverted signal of PID. The PID Data transaction is protected by the inverted mirror Data of PID and nPID. The controller in both the host and device sides should verify the validity of the PID. PID Codes are defined in Table 1 given below.

TABLE 1

| PID Codes | | | |
|---|---|---|---|
| PID Type | PID Name | PID<3:0>* | Description |
| Token | OUT | 0001B | Address + endpoint number in host-to-function transaction |
|  | IN | 1001B | Address + endpoint number in function-to-host transaction |
|  | SOF | 0101B | Start-of-Frame marker and frame number |

TABLE 1-continued

PID Codes

| PID Type | PID Name | PID<3:0>* | Description |
|---|---|---|---|
| | SETUP | 1101B | Address + endpoint number in host-to-function transaction for SETUP to a control pipe |
| Data | DATA0 | 0011B | Data packet PID even |
| | DATA1 | 1011B | Data packet PID odd |
| | DATA2 | 0111B | Date packet PID high-speed, high bandwidth isochronous transaction in a microframe (see Section 5.9.2 for more information) |
| | MDATA | 1111B | Data packet PID high-speed for split and high bandwidth isochronous transactions (see Sections 5.9.2, 11.20, and 11.21 for more information) |
| Handshake | ACK | 0010B | Receiver accepts error-free data packet |
| | NAK | 1010B | Receiving device cannot accept data or transmitting device cannot send data |
| | STALL | 1110B | Endpoint is halted or a control pipe request is not supported |
| | NYET | 0110B | No response yet from receiver (see Sections 8.5.1 and 11.17-11.21) |
| Special | PRE | 1100B | (Token) Host-issued preamble. Enables downstream bus traffic to low-speed devices. |
| | ERR | 1100B | (Handshake) Split Transaction Error Handshake (reuses PRE value) |
| | SPLIT | 1000B | (Token) High-speed Split Transaction Token (see Section 8.4.2) |
| | PING | 0100B | (Token) High-speed flow control probe for a bulk/control endpoint (see Section 8.5.1) |
| | Reserved | 0000B | Reserved PID |

*Note:
PID bits are shown in MSb order. When sent on the USB, the rightmost bit (bit 0) will be sent first.

3. Address, End Point, CRC5 Field
 (1) Address =>7-bit, ADDR[6:0]
 (2) End Point =>4-bit, EndP[3:0]
 (3) Token CRC=>5-bit, TCRC[4:0]
  {ADDR[6:0] & EndP[3]}+{EndP[2:0] & TCRC[4:0]}

Where TCRC is a 5-bit Token CRC, and the CRC on the Mu card is optional. If CRC is turned on, the CRC check must exist on both of the host and device. If, however, CRC is disabled, Wrapper must generate a CRC for a USB controller. Since Default is disabled CRC, there is no CRC field when CRC is disabled.

4. EOP Field
 (1) 1-bit: DAT0=1b
 (2) 4-bit: DAT[3:0]=xxx1b
 (3) 8-bit: DAT[7:0]=xxxxxxx1b
 (4) 16-bit: DAT[15:0]=xxxxxxxxxxxxxxx1b Where "x" refers to a "don't care" condition. For solving an even/odd byte issue on the 16-bit mode transaction, OddByte bit is added on the b [15] of the EOP field. If OddByte=1, then the last byte on the DATA [15:8] is invalid. If OddByte=0, then the last word on the DATA [15:0] is valid.

5. Token Packet Format
Token Packet is composed of 3-byte SYNC and EOP. The Token packet supports at least the 1-bit, 4-bit and 8-bit modes.

(1) 1-bit: (LSB First)
 SYNC+PID+ADDR+ENDP+CRC5+EOP
(2) 4-bit: {DAT[3:0]}
 SYNC+PID+not(PID)+A[3:0]+{ENDP[0] & A[6:4]}+{CRC0 & ENDP[3:1]}+CRC[5:1]+EOP
(3) 8-bit mode: {DAT[7:0]}
 SYNC+{not(PID) & PID}+{EP[0] & A[6:0]}+{TCRC[4:0] & EP[3:1]}+EOP
5.1. Start-of-Frame Format
 SYNC+{not(PID) & PID}+{FN[10:3]}+{FN[2:0] & TCRC[4:0]}+EOP Where FN refers to Frame Number.

6. DATA PACKET FORMAT 6.1. Data Field Format
 (i) 1-bit: (LSB first)

Byte N-1     Byte N     Byte N+1

(ii) 4-bit

Byte N-1   Byte N   Byte N+1

(iii) 8-bit (iv) 16-bit

Where the 16-bit mode is used only in Data Packet.
6.2. Data Packet Format
 SYNC + {not(PID) & PID} + {DAT[7:0]}*(0~1024) + {DCRC[15:8]} + {DCRC[7:0]} + EOP
Where DCRC is Data CRC with 16-bit Polynomial:
$X^{16}+X^{15}+x^2+1$ (SEED = 800Dh)

7. Handshake Packet Format
 (1) 1-bit: (LSB First)
  SYNC+PID+EOP
 (2) 4-bit: {DAT[3:0]}
  SYNC+PID+not(PID)+EOP
 (3) 8-bit mode: {DAT[7:0]}
  SYNC+{not(PID) & PID}+EOP 8. Special Packet Format
8.1. Ping Format
(i) 1-bit: (LSB First)
SYNC+PID+ADDR+ENDP+CRC5+EOP
(ii) 4-bit: {DAT[3:0]}
SYNC+PID+not(PID)+A[3:0]+{ENDP[0] & A[6:4]}+ {CRC0 & ENDP[3:1]}+CRC[5:1]+EOP
(iii) 8-bit mode: {DAT[7:0]}
SYNC+{not(PID) & PID}+{EP[0] & A[6:0]}+{TCRC[4:0] & EP[3:1]}+EOP
9. Transfer Types The Transfer Types are inherent from the USB standard, including (1) Control, (2) Interrupt, (3) Bulk, and (4) Isochronous.

10. Signal Integrity

A signal or data transportation in the bus has 3 kinds of protections:

(1) PIED is protected by inverted mirror of PID and nPID. Where the nPID is an inverted signal of PID.

(2) Token Packet and Start-of-Frame are protected by CRC5, of which the Polynomial and the seed are as follows:
$X^5+X^{2+1}$ with SEED=01100b (3) Data Packet is protected by CRC16, of which the Polynomial and the seed are as follows:
$X^{16}+X^{15}+X^2+1$ with SEED=800Dh 11. Bus Width and Setting The device is powered at the 1-bit bus mode. The host can set the bus width of 1-bit (initial), 4-bit, 8-bit, or 16-bit to be operated on both sides.

(1) 1-bit: Token (1-bit), Handshake (1-bit), Special (1-bit), Data (1-bit).

(2) 4-bit: Token (4-bit), Handshake (4-bit), Special (4-bit), Data (4-bit).

(3) 8-bit: Token (8-bit), Handshake (8-bit), Special (8-bit), Data (8-bit).

(4) 16-bit: Token (8-bit), Handshake (8-bit), Special (8-bit), Data (16-bit).

Figure 4B:
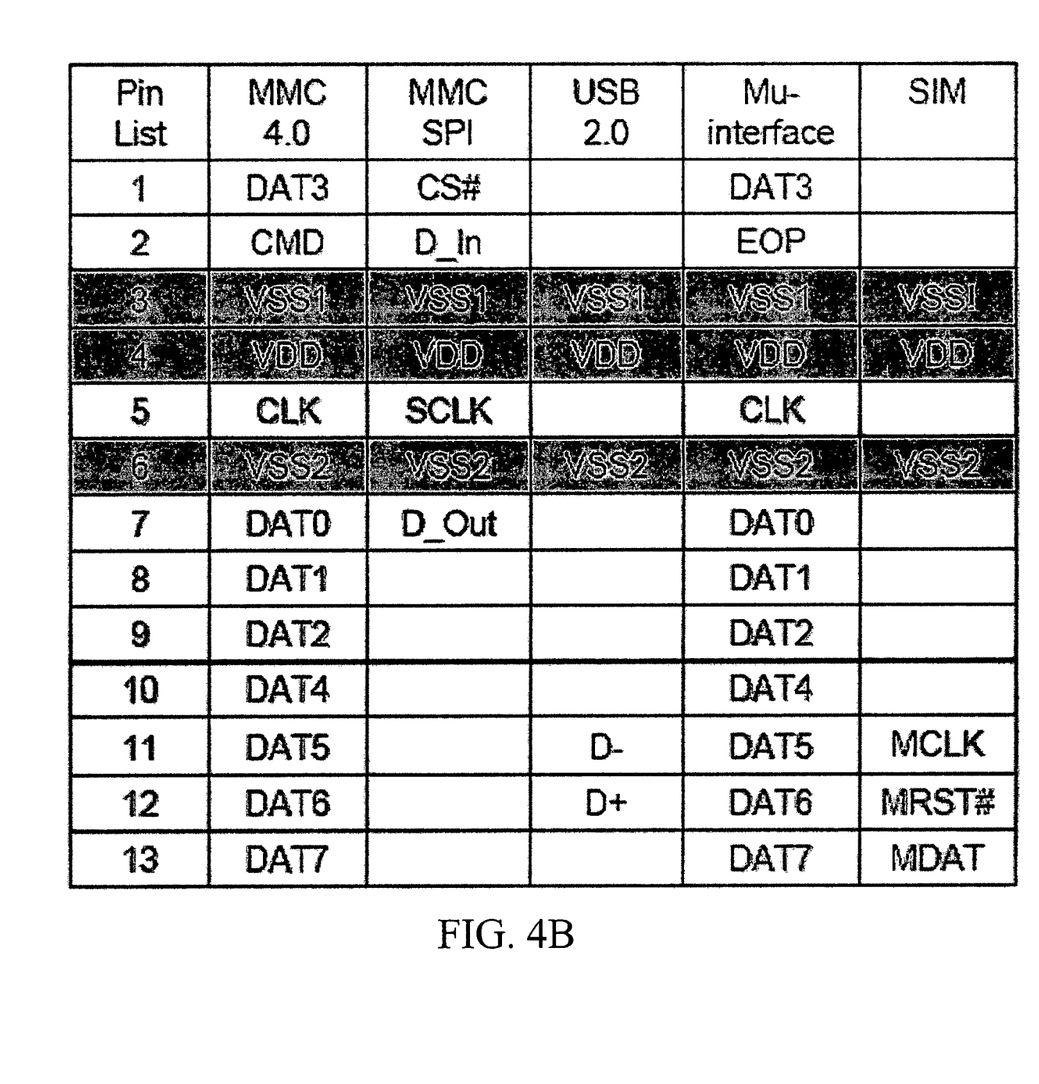
FIG. 4B is a proposed pin assignment chart of a removable electronic device in accordance with another embodiment of the present invention.

FIG. 4B is a proposed pin assignment chart of a removable electronic device in accordance with another embodiment of the present invention. Unlike the 20-pin assignment for a 16-bit application illustrated in FIG. 4A, FIG. 4B illustrates a 13-pin assignment for an 8-bit application. The eleventh and twelfth pins for the USB mode, defined for D− and D+, respectively, are used to determine whether the USB mode is selected. Furthermore, pins 11, 12 and 13 are defined for SIMM card applications.

Figure 5:
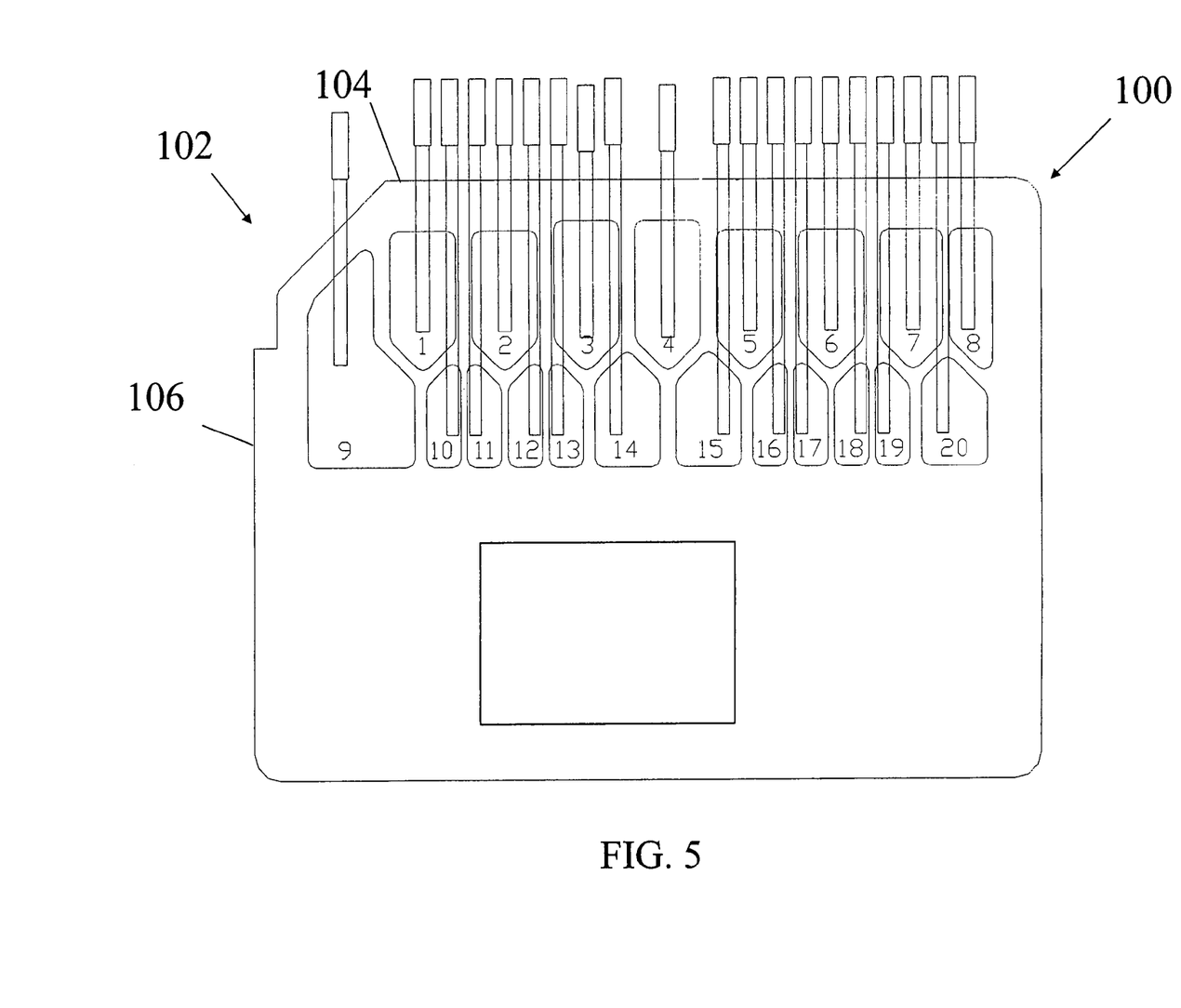
FIG. 5 is a diagram of a removable electronic device in accordance with one embodiment of the present invention.

FIG. 5 is a diagram of a removable electronic device 100 in accordance with one embodiment of the present invention. Referring to FIG. 5, electronic device 100 includes a notch 102 on the upper left-hand corner to prevent incorrect insertion of electronic device 100. In addition, notch 102 and related counter parts serve to allow for backward compatibility of MMC and USB applications, but not vice versa. In one aspect, notch 102 intersects the adjacent sides 104 and 106 with substantially the same angle, approximately 45 degrees.

Electronic device 100 also includes a plurality of interweaving contact pads labeled 1 to 20, which correspond to the pins illustrated in FIG. 4A. The interweaving design in the contact pads allows additional pins to be present in the same real estate. As a result, a different number of contact pads may alternately be used. The contact pads, connected with a memory circuit chip (not shown) within electronic device 100, are positioned in twenty recesses on a top surface along front side 104 and notch 102. The contact pads may be divided into a first row and a second row. Each of the contact pads includes a substantially tapered end such that contact pads of the first row are arranged with the corresponding contact pads of the second row by their substantially tapered ends. The substantially tapered ends allow smooth contact with the host's contact terminals.

Figure 6A:
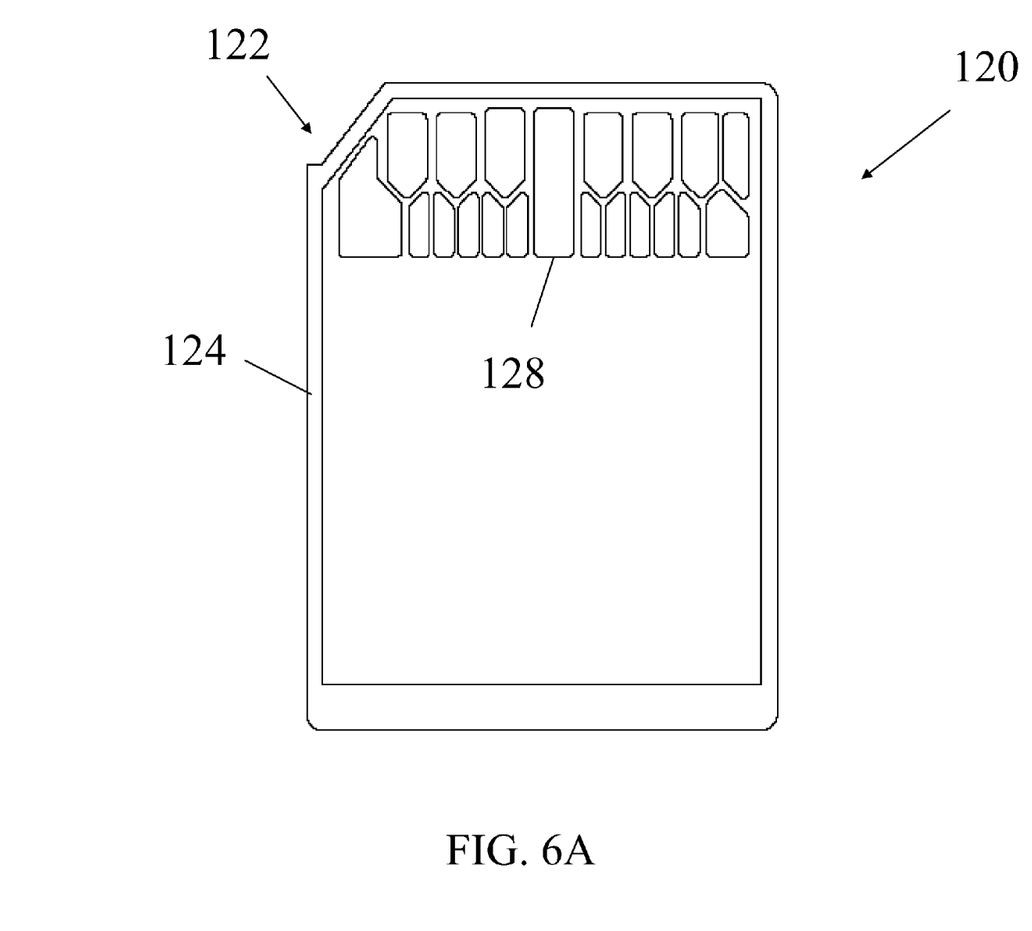
FIGS. 6A and 6B show exemplary electronic devices in accordance with embodiments of the present invention.
Figure 6B:
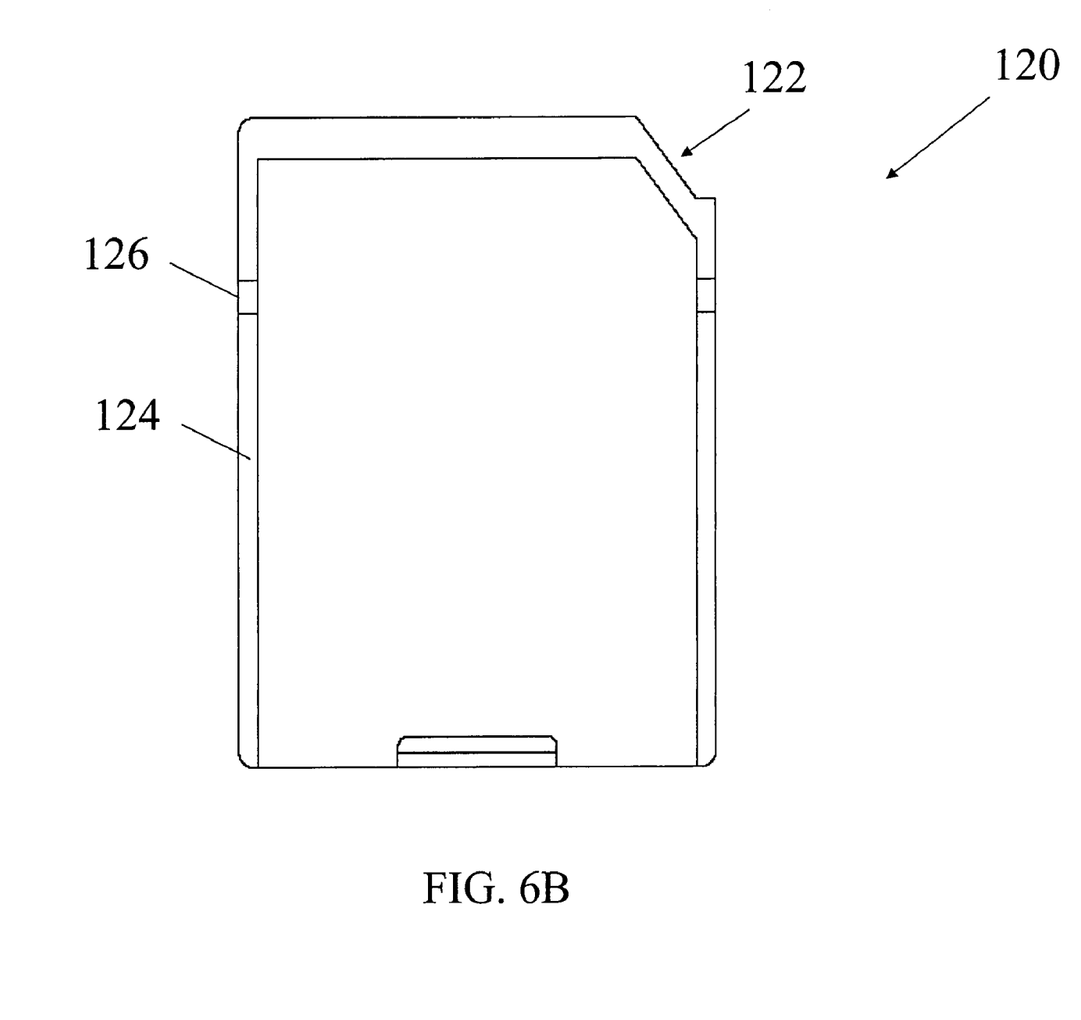

FIGS. 6A and 6B are diagrams of a removable electronic device 120 in accordance with another embodiment of the present invention. FIG. 6A is a top view of electronic device 120 having a housing (not numbered). Referring to FIG. 6A, the housing includes a top surface, a bottom surface and a periphery. Electronic device 120 includes a notch 122 and a substantially "U-shaped" indentation 124 on the periphery of the housing to allow for a low-profile design. Specifically, indentation 124 allows a card reader (not shown) in the host to grasp electronic device 120 and secure electronic device 120 through indentation 124, as opposed to the conventional application of using the bulk of the memory card to secure its position in the host. As such, the notch design of the memory card of the present invention obviates this consideration in the memory card design and in turn allows the design of the memory card to be minimized. Accordingly, the profile of the card reader in the host may also be minimized.

In addition to a plurality of interweaving contact pads (not numbered) positioned in a first row and a second row, electronic device 120 includes a contact pad 128 extending across the first row to the second row. In one embodiment, the total number of the first row of contact pads and the second row of contact pads is 20.

FIG. 6B is a bottom view of electronic device 120. Referring to FIG. 6B, electronic device 120 includes additional indentations 126 on the periphery to allow for locking of electronic device 120 to the housing at the host side.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A removable electronic device for transferring data to or receiving data from a host device, the removable electronic device comprising:

a detector configured to detect a mode of operation to distinguish among a multimedia card (MMC) compatible mode, a universal serial bus (USB) compatible mode, and a Mu mode, wherein the Mu mode supports transfer of data compatible with the MMC compatible mode between the removable electronic device and the host device via a first USB interface, wherein, during detection of the Mu mode, the detector is configured to receive a command signal from the host device and, in response to the command signal, provide a Mu response and implement a synchronization wait period;

a wrapper configured to convert data for data transfer via the first USB interface in the Mu mode;

a USB physical layer circuit configured to transfer data compatible with the USB compatible mode via a second USB interface;

a USB compatible device controller configured to control data transfer in the USB compatible mode via the second USB interface and data transfer in the Mu mode via the first USB interface; and an MMC compatible device controller configured to control data transfer in the MMC compatible mode via an MMC compatible interface.

2. The device of claim 1, wherein the MMC compatible mode includes one of an MMC 4.0 compatible or an MMC serial-peripheral interface (SPI) compatible application.

3. The device of claim 1, wherein the Mu mode supports one of 1-bit, 4-bit, 8-bit or 16-bit data transfer.

4. The device of claim 1, wherein the wrapper is configured to convert data compatible with the MMC mode into data compatible with a USB 2.0 Transceiver Macrocell Interface (UTMI) mode.

5. The device of claim 1, further comprising a memory module connected to the MMC compatible device controller and the USB compatible device controller.

6. The device of claim 5, wherein the USB compatible device controller is configured to control data transfer between the host device and the memory module via the USB physical layer circuit in the USB compatible mode.

7. The device of claim 5, wherein the MMC compatible device controller is configured to control data transfer between the host device and the memory module in the MMC compatible mode.

8. The device of claim 5, wherein the USB compatible device controller is configured to control data transfer between the host device and the memory module via the wrapper in the Mu mode.

9. A removable electronic device for transferring data to or receiving data from a host device, the removable electronic device comprising:
    an application module;
    a detector configured to detect a mode of operation among a plurality of modes of operations, including a universal serial bus (USB) compatible mode, a first mode other than the USB compatible mode and a Mu mode, wherein the Mu mode supports transfer of data compatible with the first mode between the application module and the host device via a first USB interface, wherein, during detection of the Mu mode, the detector is configured to receive a command signal from the host device and, in response to the command signal, provide a Mu response and implement a synchronization wait period;
    a wrapper configured to convert data in order for data transfer via the first USB interface in the Mu mode;
    a USB physical layer circuit configured to transfer data compatible with the USB compatible mode via a second USB interface; and
    a USB compatible device controller configured to control data transfer in the Mu mode via the first USB interface and data transfer in the USB compatible mode via the second USB interface.

10. The device of claim 9, further comprising a device controller configured to control data transfer between the host device and the application module in the first mode.

11. The device of claim 9, wherein the first mode of operations includes one of a multimedia a card (MMC) compatible mode, a security digital (SD) mode, a compact flash (CF) mode or a smart media (SM) mode.

12. The device of claim 11, wherein the MMC compatible mode includes one of an MMC 4.0 compatible or an MMC serial-peripheral interface (SPI) compatible application.

13. The device of claim 9, wherein the application module includes one of a memory storage or an input/output (I/O) interface.

14. A method for a removable electronic device to detect a mode of operation to distinguish among a multimedia card (MMC) compatible mode, a universal serial bus (USB) compatible mode and a Mu mode, wherein the Mu mode supports transfer of data compatible with the MMC compatible mode via a first USB interface, the removable electronic device being configured to transfer data to or receive data from a host device, the method comprising:
    determining whether a power source voltage at the host device is greater than a predetermined voltage level;
    accessing the USB compatible mode via a second USB interface when the power source voltage is determined to be greater than the predetermined voltage level; or otherwise when the power source voltage is determined to be less than or equal to the predetermined voltage level:
        receiving a command signal sent from the host device;
        determining whether the command signal corresponds to a Mu mode format; and
        providing a response to the command signal, implementing a synchronization wait period, and accessing the Mu mode when the command signal is determined to correspond to the Mu mode format; or otherwise,
    accessing the MMC compatible mode when the command signal is determined to not correspond to the Mu mode format.

15. The method of claim 14, further comprising detecting the power source voltage at the host device.

16. The method of claim 15, further comprising cutting off the power source voltage when it is determined that a predetermined time period has expired and a mode of operation has not been detected.

17. The method of claim 14, further comprising waiting for a number of clocks for synchronization in response to the command signal corresponding to the Mu format.

18. A method for a device that receives a removable electronic device to detect a mode of operation among a multimedia card (MMC) compatible mode, a universal serial bus (USB) compatible mode and a Mu mode, the removable electronic device being configured to transfer data to or receive data from the device, the method comprising:
    sending a command signal corresponding to a Mu mode format after receiving the removable electronic device, wherein the Mu mode supports transfer of data compatible with the MMC compatible mode via a first USB interface;
    detecting whether a response to the command signal is provided by the removable electronic device; and
    determining that the mode of operation is the MMC compatible mode when a response to the command signal is not detected; or otherwise when a response to the command is detected,
        determining that the mode of operation is the Mu mode, implementing a synchronization wait period, and operating in the Mu mode,
        wherein operating in the Mu mode includes transferring data to or receiving data from the removable electronic device via the first USB interface.

19. The method of claim 18, further comprising sending a number of clocks to the removable electronic device for synchronization.

20. The method of claim 18, further comprising assessing an MMC serial-peripheral interface (SPI) compatible mode of operation.

21. A method for a removable electronic device to detect a mode of operation to distinguish among a first mode of operation, a universal serial bus (USB) compatible mode of operation and a Mu mode of operation, wherein the Mu mode supports transfer of data compatible with the first mode via a first USB interface, the removable electronic device being configured to transfer or receive data from a host device, the method comprising:

receiving a command signal sent from the host device;

determining whether the command signal corresponds to a Mu mode format; and providing a response to the command signal to the host device, implementing a synchronization wait period, and accessing the Mu mode of operation when the command signal is determined to correspond to the Mu mode format; or otherwise accessing the first mode of operation when the command signal is determined to not correspond to the Mu mode format.

22. The method of claim 21, wherein the first mode includes one of an MMC compatible, an MMC serial-peripheral interface (SPI) compatible, a security digital (SD) compatible, a compact flash (CF) compatible or a smart media (SM) compatible mode of operation.

* * * * *

UNITED STATES PATENT AND TRADEMARK OFFICE
CERTIFICATE OF CORRECTION

PATENT NO. : 7,606,947 B2  Page 1 of 1
APPLICATION NO. : 11/190233
DATED : October 20, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 489 days.

Signed and Sealed this

Twelfth Day of October, 2010

David J. Kappos
*Director of the United States Patent and Trademark Office*